United States Patent [19]

Hoshino et al.

[11] Patent Number: 5,368,887
[45] Date of Patent: Nov. 29, 1994

[54] PROCESS FOR PRODUCING THIN GLASS FILM BY SOL-GEL METHOD

[75] Inventors: Sumio Hoshino; Masumi Ito; Hiroo Kanamori, all of Yokohama, Japan

[73] Assignee: Sumitomo Electric Industries, Ltd., Osaka, Japan

[21] Appl. No.: 51,285

[22] Filed: Apr. 23, 1993

Related U.S. Application Data

[63] Continuation of Ser. No. 781,848, Oct. 24, 1991, abandoned.

[30] Foreign Application Priority Data

Oct. 25, 1990 [JP] Japan ................... 2-285882
Jun. 20, 1991 [JP] Japan ................... 3-148610
Jun. 20, 1991 [JP] Japan ................... 3-148611

[51] Int. Cl.$^5$ .............................. B05D 3/02
[52] U.S. Cl. ........................ 427/226; 427/340; 427/376.2; 427/377
[58] Field of Search .............. 427/344, 397.7, 387, 427/226, 340, 376.2, 376.4, 377; 423/338; 65/60.52, 901; 501/12

[56] References Cited

U.S. PATENT DOCUMENTS

| | | | |
|---|---|---|---|
| Re. 32,107 | 4/1986 | January ........................... | 501/11 |
| 4,397,666 | 8/1983 | Mishima et al. ................ | 65/901 |
| 4,614,673 | 9/1986 | Bendig ........................... | 427/427 |
| 4,636,440 | 1/1987 | Jada ................................ | 428/446 |
| 4,652,467 | 3/1987 | Brinker et al. ................. | 427/162 |
| 4,680,048 | 7/1987 | Metoki et al. .................. | 501/12 |
| 4,767,433 | 8/1988 | Iura et al. ....................... | 501/12 |
| 4,842,888 | 6/1989 | Haluska et al. ................. | 427/397.7 |
| 4,847,162 | 7/1989 | Haluska et al. ................. | 427/123 |
| 4,898,691 | 2/1990 | Borzo et al. ..................... | 252/582 |
| 4,937,208 | 6/1990 | Yamamoto ...................... | 501/12 |
| 4,948,843 | 8/1990 | Roberts et al. .................. | 525/342 |
| 4,957,725 | 9/1990 | Potember et al. ............... | 501/12 |
| 4,988,800 | 1/1991 | Greco et al. .................... | 502/171 |
| 4,994,218 | 2/1991 | Tokumoto et al. .............. | 501/12 |
| 5,019,146 | 5/1991 | Hara ................................ | 501/12 |
| 5,049,338 | 9/1991 | Varaprasod et al. ............ | 264/183 |
| 5,112,676 | 5/1992 | Cot et al. ........................ | 427/126.2 |
| 5,116,637 | 5/1992 | Baney et al. .................... | 427/226 |
| 5,262,201 | 11/1993 | Chandra et al. ................ | 427/376.2 |

FOREIGN PATENT DOCUMENTS

| | | | |
|---|---|---|---|
| 0287093 | 10/1988 | European Pat. Off. . | |
| 0310308 | 4/1989 | European Pat. Off. . | |
| 60-27615 | 2/1985 | Japan ............................. | 427/344 |
| 60-54929 | 3/1985 | Japan ............................. | 501/12 |
| 61-26525 | 2/1986 | Japan ............................. | 427/344 |
| 61-40825 | 2/1986 | Japan ............................. | 501/12 |
| 61-97137 | 5/1986 | Japan ............................. | 65/901 |

OTHER PUBLICATIONS

Chemical Abstracts, vol. 103, No. 2, Jul. 1985, Columbus, Ohio., abstract No. 10353B, pp. 259–260.

Primary Examiner—Terry J. Owens
Attorney, Agent, or Firm—Cushman, Darby & Cushman

[57] ABSTRACT

A thin glass film is formed on a substrate using a sol-gel method by applying to the substrate a hydrolyzable solution which contains a metal alkoxide, water, an alcohol and an acid, contacting the applied solution with an atmosphere containing ammonia and an alcohol to polycondensate the metal alkoxide, and heating to form the thin glass film.

10 Claims, No Drawings

PROCESS FOR PRODUCING THIN GLASS FILM BY SOL-GEL METHOD

This is a continuation of application Ser. No. 07/781,848, filed on Oct. 24, 1991, now abandoned.

BACKGROUND OF THE INVENTION

1. Field of the Invention

The present invention relates to an improved process for producing a thin glass film by a sol-gel method.

2. Description of the Related Art

A sol-gel method comprises hydrolyzing and polycondensating a metal alkoxide in a solution containing the metal alkoxide, water and an alcohol (hereinafter referred to as "hydrolyzable solution") to form a porous solid material and heating the porous material to produce a glass material. Since the sol-gel method produces the glass through the hydrolyzable solution, it is easy to uniformly coat a wide substrate with the glass. Then, the sol-gel method is a promising method for coating the substrate with a glass film having a new function of mechanical properties, chemical protection and optical properties.

As described in, for example, "YOGYO KYOKAI-SHI" (Ceramic Society Journal), 90(6), 328-332 (1952), a general procedure of the sol-gel method comprises mixing ethyl silicate, titanium isopropoxide, ethanol, water and HCl as a catalyst to prepare a hydrolyzable solution (a coating liquid), dipping a substrate in the hydrolyzable solution, lifting up the substrate at a constant rate to form a film of the hydrolyzable solution on the substrate and drying and heating the film to obtain a glass film.

Hitherto, the sol-gel method can produce a transparent uniform coating film having a thickness of 0.1 to 0.3 $\mu$m. However, though it is tried to produce a glass film having a thickness larger than 0.3 $\mu$m, the glass film tends to have various defects such as cracks, white turbidity, and peeling from the substrate. To increase the film thickness, it is known to add glycerin or ethyl ether as a thickener. By the addition of the thickner, the maximum film thickness reaches about 0.5 $\mu$m.

SUMMARY OF THE INVENTION

One object of the present invention is to provide a process for producing a thin glass film having a large film thickness by a sol-gel method.

Another object of the present invention is to provide a process for producing a uniform thin glass film by a sol-gel method by which a film thickness is well controlled.

According to the present invention, there is provided a process for producing a thin glass film comprising applying a hydrolyzable solution which contains a metal alkoxide, water, an alcohol and an acid, contacting said applied solution to an atmosphere selected from the group consisting of ammonia and a mixture of ammonia and an alcohol to polycondensate said metal alkoxide and heating it to form a thin glass film.

DETAILED DESCRIPTION OF THE INVENTION

By the conventional sol-gel method, the coated film shrinks and solidifies during heating. In this step, if the polycondensation has not been sufficiently proceeded, the film cannot stand against a stress caused by shrinkage, in particular when the film thickness is large, and then the film tends to be cracked.

According to the present invention, since the polycondensation may be accelerated by contact to ammonia, the film can stand against the stress caused by shrinkage even in case of the thick film, and the transparent uniform glass film is obtained. Probably, ammonia may act as a catalyst of the polycondensation of the metal alkoxide, and its amount can be a catalytic amount.

In the hydrolyzable solution to be used in the process of the present invention, contents of the alcohol and water should be low. A molar ratio of the alcohol to the metal alkoxide is from 0.5:1 to 5:1, preferably from 1:1 to 4:1. A molar ratio of water to the metal alkoxide is from 1:1 to 10:1, preferably from 2:1 to 5:1.

As the metal alkoxide, any of the conventionally used alkoxides may be used. Preferred examples are methoxide, ethoxide and propoxide of silicon, titanium, germanium, aluminum and boron.

Also, as the alcohol, any of the conventionally used ones may be used. Examples are methanol, ethanol, isopropanol, butanol and the like.

The acid contained in the hydrolyzable solution accelerates the hydrolysis of the metal alkoxide. Specific examples of the acid are hydrochloric acid, sulfuric acid, nitric acid, phosphoric acid, etc.

The acid is used in an amount such as to adjust pH of the solution to, for example, 1 (one) to 6.

The hydrolyzable solution may contain a surfactant (e.g. higher alcohols such as polyethylene glycol) so as to improve adhesion of the solution to the substrate and to stably form the thin glass film.

To the hydrolyzable solution, a rare earth element or its compound, or an optical non-linear material may be added.

Examples of the rare earth metal or its compound are Er, Nd or their salts. By the addition of these elements or compounds, the formed glass film can be used to generate a laser beam.

Examples of the optically non-linear material are organic materials such as p-nitroaniline (p-NA) and 2-methyl-4-nitroaniline (MNA), or semiconductive particles such as CdS, CuCl, PbS and the like. By the addition of the optical non-linear material, the formed glass film has the optical non-linearity.

In the process of the present invention, the hydrolyzable solution applied on the substrate is subjected to the polycondensation reaction while contacting it to the atmosphere comprising ammonia and optionally an alcohol (e.g. methanol, ethanol, isopropanol, etc.). Though a temperature and pressure may be room temperature and atmospheric pressure, higher temperature and higher pressure will be more effective. When the polycondensation is carried out at an elevated temperature, the reaction is accelerated so that the film can stand against the stress caused by shrinkage. However, a temperature higher than 300° C. will evaporate the solvent vigorously, so that the film shrinks before the polycondensation proceeds sufficiently and is cracked.

The higher pressure also effectively accelerates the polycondensation and prevents the evaporation of the solvent. Up to 5 Atm., the effect increases, but at higher pressure, the increase of the effect is not remarkable. In addition, the too high pressure makes an apparatus large and complicated.

Then, the polycondensation is preferably carried out at a temperature from room temperature to 300° C. under pressure from atmospheric pressure to 5 Atm.

Other steps of the process of the present invention can be carried out under the same conditions as those in the conventional sol-gel method.

For example, the hydrolyzable solution may be applied to the substrate by dip coating or spin coating.

The substrate may be any one of the conventionally used materials, for example, glass, metals or plastics.

In the dip coating, the substrate is dipped in the hydrolyzable solution and lifted up gradually to form a thin film of the hydrolyzable solution on the substrate surface. In the spin coating, the substrate is set in a sample holder which can be rotated at a high speed and the hydrolyzable solution is dropped on the substrate rotating at 500 to 5000 rpm to form a uniform thin film of the hydrolyzable solution on the substrate surface.

Preferably, a viscosity of the hydrolyzable solution is increased before the application onto the substrate.

In one preferred embodiment, the hydrolyzable solution is aged to adjust its viscosity at room temperature in a range from 0.1 to 10 poises. By the increase of the viscosity of the hydrolyzable solution, it is easy to control a film thickness of the hydrolyzable solution on the substrate. When the viscosity is less than 0.1 poise, the film thickness cannot be increased. When the viscosity is larger than 10 poises, the film surface has unevenness and the finally formed glass film is not uniform. The viscosity can be changed by changing the aging time.

In another preferred embodiment, the hydrolyzable solution is cooled to a temperature of $-150°$ C. to $+10°$ C. and then applied on the substrate which is cooled to the same temperature as the hydrolyzable solution or lower.

When the cooling temperature is lower than $-150°$ C., the viscosity becomes too large to form a uniform film. When the substrate temperature is higher than the cooled hydrolyzable solution, the temperature of the applied solution is raised and the viscosity is decreased.

In a further preferred embodiment, the hydrolyzable solution is subjected to reduced pressure, for example, from 10 to 500 Torr. to evaporate volatile components such as the alcohol.

By the increase of the viscosity of the hydrolyzable solution, the film thickness of the hydrolyzable solution applied on the substrate can be increased. Thereby, the cracking of the formed film due to shrinkage can be prevented during the subsequent heating of the film.

PREFERRED EMBODIMENTS OF THE INVENTION

The present invention will be illustrated by the following Examples, which do not limit the scope of the present invention.

EXAMPLE 1

In a beaker, silicon ethoxide (50 ml), ethanol (20 ml), water (20 ml), 12N hydrochloric acid (0.6 ml) and polyethylene glycol (4 g) were charged and stirred for about 30 minutes to obtain a hydrolyzable solution, which was aged at room temperature for 24 hours.

As a substrate, a soda lime silica glass plate (a width of 40 mm, a length of 50 mm and a thickness of 1 mm) was cleaned with acetone. Then, on the substrate, the aged hydrolyzable solution was spin coated. Before the coating, the hydrolyzable solution had a viscosity of 4 poises.

Then, the substrate carrying the film of the hydrolyzable solution was kept in an atmosphere of a mixture of ammonia and ethanol (a volume ratio of 1:1) at 60° C. for about one hour, and then dried at 100° C. in air for 24 hours followed by heating at 500° C. in air to obtain a solidified transparent glass film having a thickness of 1.7 μm.

EXAMPLE 2

In the same manner as in Example 1 except that the hydrolyzable solution was cooled to $-50°$ C. or $-100°$ C. and the substrate was cooled to $-50°$ C. or $-100°$ C., the hydrolyzable solution was spin coated on the substrate, dried and heated to obtain a transparent glass thin film having a thickness of 1.2 μm

Comparative Example 1

In the same manner as in Example 2 except that the hydrolyzable solution and the substrate were both cooled to $-180°$ C., a glass thin film was formed but had unevenness on the film surface.

EXAMPLE 3

In a beaker, silicon ethoxide (50 ml), titanium isopropoxide (1 ml), ethanol (10 ml) and 1N hydrochloric acid (20 ml) were charged and stirred for about 30 minutes to obtain a hydrolyzable solution, which was kept under pressure of 10 Torr. for 15 minutes to concentrate the solution.

Then, in the same manner as in Example 1, the concentrated hydrolyzable solution was spin coated on the substrate, dried and heated to obtain a solidified transparent glass film having a thickness of 1.5 μm.

EXAMPLE 4

In a beaker, silicon ethoxide (50 ml), ethanol (10 ml), 1N hydrochloric acid (20 ml) and erbium chloride (900 mg) were charged and stirred for about 30 minutes to obtain a hydrolyzable solution.

Then, a quartz substrate was dipped in the hydrolyzable solution and lifted up at a constant rate to coat the substrate with the hydrolyzable solution. The substrate having the coated hydrolyzable solution film was treated in the same manner as in Example 1 to obtain a Er-doped transparent glass film having a thickness of 1 μm.

What is claimed is:

1. A process for producing a glass film comprising;
    applying a hydrolyzable solution containing a metal alkoxide, water, an alcohol and an acid to a substrate;
    contacting said hydrolyzable solution with an atmosphere of a mixture of ammonia and an alcohol to polycondensate said metal alkoxide; and
    drying and heating said hydrolyzable solution to form a glass film.

2. The process according to claim 1, wherein said hydrolyzable solution is kept standing before application to adjust its viscosity to 0.1 to 10 poises.

3. The process according to claim 1, wherein said hydrolyzable solution is cooled to a temperature of $-150°$ C. to $+10°$ C. and then applied on said substrate cooled to the same temperature as that of said hydrolyzable solution or lower.

4. The process according to claim 1, wherein said hydrolyzable solution is subjected to a pressure of from 10 to 500 Torr to concentrate said solution before application.

5. The process according to claim 1, wherein a molar ratio of said alcohol in said hydrolyzable solution to said metal alkoxide is from 0.5:1 to 5:1, and a molar ratio of water to said metal alkoxide is from 1:1 to 10:1.

6. The process according to claim 1, wherein said applied hydrolyzable solution is polycondensated at a temperature of room temperature to 300° C.

7. The process according to claim 1, wherein said applied hydrolyzable solution is polycondensated under pressure of from atmospheric pressure to 5 Atm.

8. The process according to claim 1, wherein said metal alkoxide is at least one selected from the group consisting of methoxide, ethoxide and propoxide of silicon, titanium, germanium, aluminum or boron.

9. The process according to claim 1, wherein said hydrolyzable solution contains at least one compound of a rare earth metal.

10. The process according to claim 1, wherein said hydrolyzable solution contains at least one optically non-linear material.

* * * * *